United States Patent
Satoh et al.

(10) Patent No.: US 6,493,165 B1
(45) Date of Patent: Dec. 10, 2002

(54) MAGNETIC DISK DRIVE

(75) Inventors: Naoki Satoh, Odawara; Seiichi Mita, Kanagawa-ken, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/406,920

(22) Filed: Sep. 28, 1999

(30) Foreign Application Priority Data

Sep. 28, 1998 (JP) ............................................ 10-290030

(51) Int. Cl.[7] .......................... G11B 5/035; G11B 20/10; G11B 20/18
(52) U.S. Cl. .............................. 360/65; 360/46; 375/232
(58) Field of Search ...................... 360/65, 46; 375/232; G11B 20/10, 5/09, 20/18; H03H 17/00, 21/00

(56) References Cited

U.S. PATENT DOCUMENTS

| | | | | |
|---|---|---|---|---|
| 5,323,422 A | * | 6/1994 | Ushirokawa | 375/14 |
| 5,363,411 A | * | 11/1994 | Furuya et al. | 375/75 |
| 5,414,571 A | * | 5/1995 | Matsushige et al. | 360/65 |
| 5,787,118 A | * | 7/1998 | Ueda | 375/232 |
| 6,078,614 A | * | 6/2000 | Brown et al. | 375/232 |
| 6,285,520 B1 | * | 9/2001 | Makiura et al. | 360/65 |

FOREIGN PATENT DOCUMENTS

| | | | | |
|---|---|---|---|---|
| JP | 407264101 A | * | 10/1995 | H04B/3/06 |
| JP | 2000298835 | * | 10/2000 | G11B/7/00 |

* cited by examiner

*Primary Examiner*—David Hudspeth
*Assistant Examiner*—Dan I. Davidson
(74) *Attorney, Agent, or Firm*—Antonelli, Terry, Stout & Kraus, LLP (57) ABSTRACT

There is provided a magnetic disk drive in which the adaptability of read signal processing of the magnetic disk drive is enhanced so that the frequency of retry or miscorrection in use is reduced. This magnetic disk drive has a read circuit, and a channel condition measuring circuit. An output of an A/D converter contained in the read circuit is supplied to a digital equalizing circuit so as to be equalized accurately. Upon input of a signal for instructing a coefficient learning circuit to learn the coefficient of the digital equalizing circuit, the initial coefficient registered in a register is set as a coefficient value in another register and the coefficient learning circuit is operated to start consecutive learning of coefficient values. In the channel condition measuring circuit, errors in a row of output values of the digital equalizing circuit are calculated and an integrated value of squares of the errors is compared with an error threshold value. If the integrated value is larger than the error threshold value, coefficient learning is regarded as being abnormal and a control signal for discarding the coefficient registered in the register is issued so that the register is reset to the initial coefficient value. The signal for instructing the coefficient learning circuit to learn the coefficient may be outputted in a sector previous to the read target sector or may be outputted in the read target sector.

10 Claims, 10 Drawing Sheets

MAGNETIC DISK DRIVE

BACKGROUND OF THE INVENTION

The present invention relates to a magnetic disk drive (HDD) and particularly to a reproduction control method for avoiding deterioration of drive performance caused by application of coefficient learning in a state in which the positional divergence of a read head is large.

The configuration and reproducing operation of a background-art magnetic disk drive will be described below.

Figure 12:
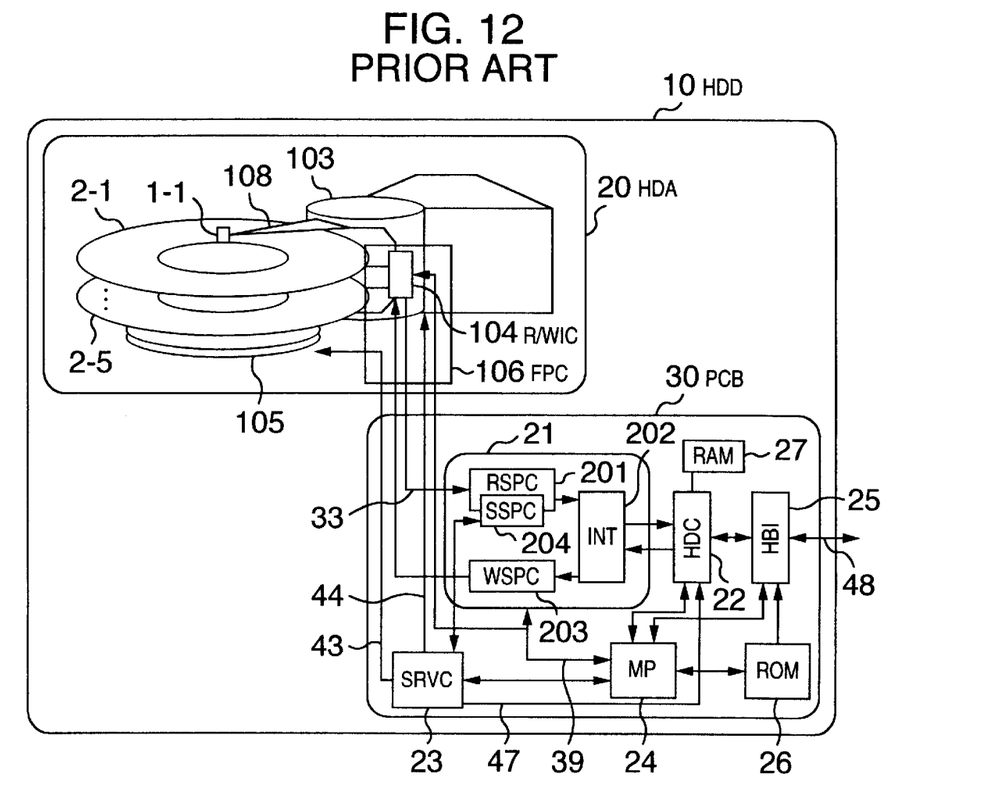
FIG. 12 is a diagram showing the overall configuration of a magnetic disk drive in the background art.

FIG. 12 shows an example of the configuration of a magnetic disk drive (HDD) 10.

The HDD 10 comprises a head disk assembly (HDA) 20, and a packaged circuit board (PCB) 30.

The HDA 20 includes magnetic disks 2-1 to 2-5, suspension 108 provided with magnetic heads 1-1 to 1-10 attached thereto, a carriage 103, a read/write IC (R/WIC) 104 attached on the carriage 103, a spindle motor 105, and a flexible printed cable (FPC) 106.

The PCB 30 is constituted by a signal processing LSI (SPC) 21, a hard disk controller chip (HDC) 22, a servo controller (SRVC) 23, a micro-processor (MP) 24, a host bus interface chip (HBI) 25, an ROM 26, a buffer RAM 27, etc.

The read operation of the HDD 10 will be described below with reference to FIGS. 12 through 15.

A read signal corresponding to a magnetic field and detected from the magnetic disk 2-1 by an MR (Magneto-Resistive) head of the magnetic head 1-1 in FIG. 12 is supplied to the R/WIC 104 through wiring on the suspension 108.

In the R/WIC 104, selection of one of the magnetic heads 1-1 to 1-10 and the sense current value of the selected MR head are set in advance through the MP 24.

A resistance change of the MR head due to the magnetic field in the magnetic disk 2-1 is converted into a voltage change. Further, the R/WIC 104 amplifies the read signal to a value of from the order of tens of mVp-p to the order of hundreds of mvp-p and outputs the amplified read signal 33 to the SPC 21.

Figure 13:
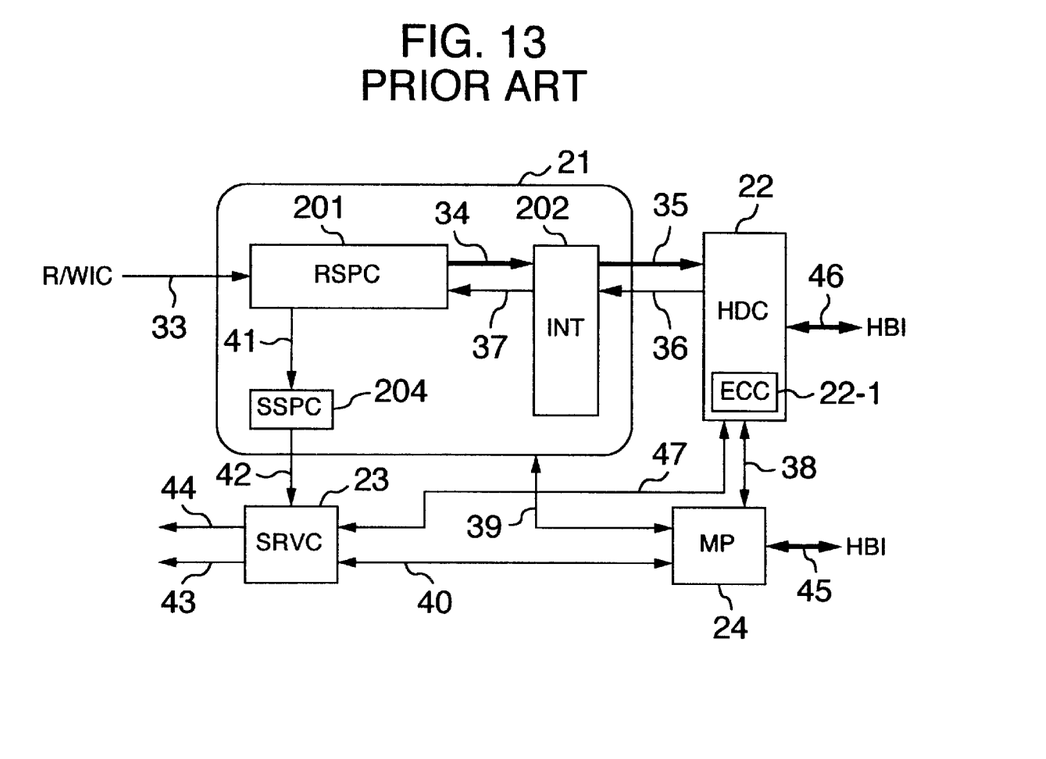
FIG. 13 is a diagram showing the overall configuration of a read signal processing system in the background art.

This signal 33 is supplied to a read signal processing circuit (RSPC) 201 of the SPC 21 in FIG. 13.

Figure 14:
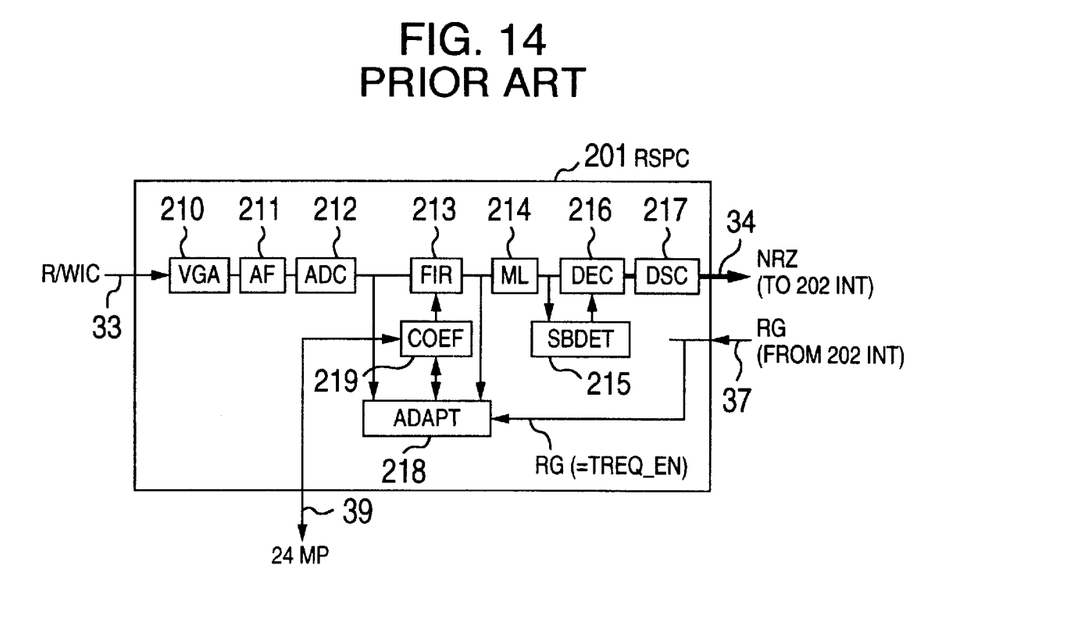
FIG. 14 is a diagram showing the reproducing circuit in the background art.

FIG. 14 shows the configuration of the RSPC 201.

The signal 33 is amplified to have a suitable amplitude by a variable gain amplifier (VGA) 210 in the first stage of the RSPC 201. Unnecessary high-frequency noise is removed from the amplified signal and the read waveform of the amplified signal is roughly equalized by an active equalizer (AF) 211.

Then, the analog signal of the AF 211 is converted into a digital signal by an A/D converter (ADC) 212. The digital signal is equalized accurately by a digital equalizer (FIR) 213 in the latter stage.

Further, the signal of the FIR 213 is detected to a row of serial data by a maximum likelihood detector (ML) 214. A sync byte (SB) indicating the start of user data is detected in this serial data row by a sync byte detector (SBDET) 215.

On the basis of a result of the detection, the serial data row is converted into parallel data and decoded by a decoder (DEC) 216. Further, the parallel data is restored to data 34 through a descrambler (DSC) 217. Further, read data 35 is supplied to the HDC 22 through an interface (INT) 202 in FIG. 13.

Further, the data 35 supplied to the HDC 22 is subjected to error detection and error correction by an error correction circuit (ECC) 22-1 in the HDC 22, and supplied as data 48 to a user (host PC, or the like) through the HBI 25.

Figure 15:
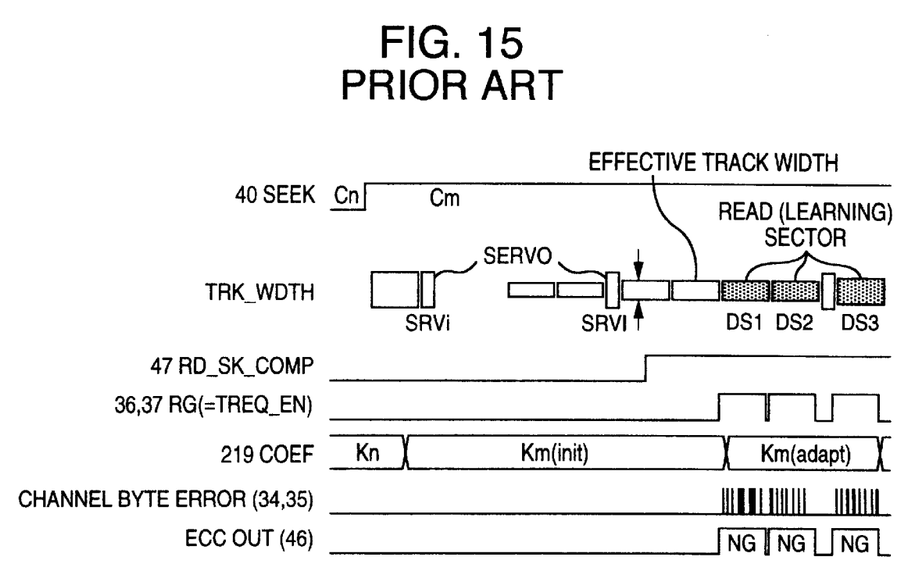
FIG. 15 is a time chart showing a sequence of operations in the background art in the case where positional divergence after seeking is relatively large.

A control operation will be described below in the case where a cylinder is sought from Cn to Cm to read a plurality of data sectors DS1, DS2, DS3 . . . as shown in FIG. 15.

TRK_WDTH shows an arrangement of servo and data regions.

The servo controller (SRVC) 23 successively reproduces servo signals SRVi recorded on a disk surface to thereby obtain a positioning signal 42 through a servo signal processing circuit (SSPC) 204 to thereby perform positioning control.

The MP 24 gives a seek command (SEEK) 40 to the SRVC 23. The SRVC 23 analyzes the positioning signal 42 obtained in a signal SRV1 (FIG. 13) in servo region. If a judgment is made from the analysis that data is enabled to read, the SRVC 23 outputs a "read seek complete" signal (RD_SK_COMP) 47 to the HDC 22. As a result, the HDC 22 outputs a "read gate" signal (RG) 36 from the data region DS1.

The threshold value of completion of positioning for issuing the RD_SK_COMP 47 in the read operation is generally set to be larger than the threshold value in the write operation to attain reduction of the seek completion time.

At read time, as shown in FIG. 14, the RG 37 supplied to the RSPC 201 through the INT 202 operates most of portions in the RSPC 201 and also operates a coefficient learning circuit (ADAPT) 218 which adaptively learns the coefficient of the FIR 213.

As a result, the coefficient value registered in an equalizing characteristic setting register (COEF) 219 is consecutively changed to a coefficient value for giving good reproducing characteristic even in the case where the resolving power of the reproductive signal 33 varies in accordance with the change of head/disk characteristic, head spacing, or the like, caused by the change of the operating environment, such as temperature, atmospheric pressure, or the like, of the HDD 10.

In such a background art, however, there were two problems as follows.

The first problem is increase of error caused by divergence occurs in the equalizing coefficient of the FIR 213.

As shown in FIG. 15, the effective track width (TRK_WDTH) varies in accordance with the positional divergence of the MR head and the positioning state at write time. Particularly just after seeking, there is the possibility that the positional divergence is widened because of the influence of settling of head, or the like.

When, for example, a data sector DS1 to be read is present just after the RD_SK_COMP 47, the read gate (RG) 37 is opened in the position of DS1 in the condition in which the sufficiently effective track width cannot be obtained because of the aforementioned deterioration, or the like.

In this condition, the ADAPT 218 cannot operate normally. As a result, the initial value Km(init) of the coefficient value of the FIR 213 registered in the equalizing characteristic setting register (COEF) 219 may diverge to a coefficient value Km(adapt) in which data reproduction cannot be performed normally on the basis of a learning operation.

In this case, the data row produced from the NRZ data 34 contains a lot of channel byte errors as shown in FIG. 15. Accordingly, there is a high possibility that the errors cannot be perfectly corrected by the error correction circuit (ECC) 22-1 in the HDC 22.

Further, if the performance for checking the miscorrection of the ECC is insufficient, the possibility that the erroneously corrected data may be sent to the host becomes high (mischecking).

Because the data sector DS2 following the data sector DS1 also uses the aforementioned abnormal coefficient value as an initial value, there is a high possibility that the same problem as described above occurs consecutively.

The data sectors DS3 . . . following the data sector DS2 form a (substantially on-track) sector region having a large effective track width. Also in the sectors DS3 . . . , there is a very high possibility that channel byte error occur frequently.

To correct this error, it is necessary to restart a read operation with the effective track width kept sufficient while rotating the disk to wait for the same sectors (DS1 . . . ) to come in the condition in which the COEF is reset to the initial value Km(init) in a data restoration sequence (retry).

If the aforementioned condition occurs frequently, the performance of the device is lowered greatly.

The second problem is that reproducing characteristic at ordinary time deteriorates.

In the background art shown in FIG. 14, the "read gate" signal (RG) is used as a signal for starting the ADAPT 218. Accordingly, in the read state, the coefficient of the FIR 213 registered in the COEF 219 always varies, so that adaptive noise is generated.

In this case, the generation of adaptive noise can be suppressed to thereby avoid the increase of output noise of the FIR 213 if not only the number of bits in the COEF 219 is set to be sufficiently larger than the number of bits in the output of the ADC 212 but also a coefficient-correction step parameter of the ADAPT 218 is set to be sufficiently small.

When the initial coefficient value is out of the optimum coefficient value because of an environmental change, or the like, there is, however, a tendency that error occurs in a sector of a read leading portion.

That is, the frequency of retries increases if a large environmental change occurs.

To cover the deterioration of the drive performance, specifications of the drive concerning environmental changes, such as head/disk characteristic, spacing between heads/disks, or the like, cannot but be set severely. Accordingly, this brings about both reduction of the yield of heads/disks and increase of the cost of the drive.

SUMMARY OF THE INVENTION

An object of the present invention is to solve the aforementioned problems, and to provide a high-performance low-cost magnetic disk drive in which the adaptability of the magnetic disk drive to read signal processing is enhanced so that the frequency of retries or miscorrections is reduced.

In order to achieve the foregoing object, according to an aspect of the present invention, there is provided a magnetic disk drive having a waveform equalization means for equalizing waveforms reproduced, and an adaptive learning means for adaptively learning the equalizing characteristic of the waveform equalization means, wherein the magnetic disk drive further has an abnormal learning detection means for detecting an abnormal operation in the adaptive learning of the equalizing characteristic just after learning of a sector, and an equalizing characteristic resetting means for resetting the equalizing characteristic before the adaptive learning to an initial value before learning of a next sector when abnormality occurs in the adaptive learning, and wherein the adaptive learning of the equalizing characteristic is performed simultaneously with an operation of reproducing designated data.

According to another aspect of the present invention, there is provided a magnetic disk drive having a waveform equalization means for equalizing waveforms reproduced, and an adaptive learning means for adaptively learning the equalizing characteristic of the waveform equalization means, wherein the magnetic disk drive further has an abnormal learning detection means for detecting an abnormal operation in the adaptive learning of the equalizing characteristic just after learning of a sector, and an equalizing characteristic resetting means for resetting the equalizing characteristic before the adaptive learning to an initial value before learning of a next sector when abnormality occurs in the adaptive learning, and wherein the adaptive learning of the equalizing characteristic is performed before an operation of reproducing designated data.

Preferably, the equalizing characteristic of the waveform equalizing means is fixed during the operation of reproducing the designated data.

According to a further aspect of the present invention, there is provided a magnetic disk drive having an active filter supplied with a read waveform of a magnetic disk, an A/D conversion means supplied with an output of the active filter, and a waveform equalizing means supplied with an output of the A/D conversion means, wherein the magnetic disk drive further has: an adaptive learning means for adaptively learning the boost characteristic of the active filter on the basis of the input and output of the waveform equalizing means so that error in the waveform equalizing means is minimized; an abnormal learning detection means for detecting an abnormal operation in adaptive learning of the boost characteristic just after learning of a sector; and a boost characteristic resetting means for resetting the boost characteristic before the adaptive learning to an initial value before adaptive learning of the next sector when abnormality occurs in adaptive learning; and wherein the adaptive learning of the boost characteristic is carried out simultaneously with the operation of reproducing the designated data.

According to a further aspect of the present invention, there is provided a magnetic disk drive having an active filter supplied with a read waveform of a magnetic disk, an A/D conversion means supplied with an output of the active filter, and a waveform equalizing means supplied with an output of the A/D conversion means, wherein the magnetic disk drive further has: an adaptive learning means for adaptively learning the boost characteristic of the active filter on the basis of the input and output of the waveform equalizing means so that error in the waveform equalizing means is minimized; an abnormal learning detection means for detecting an abnormal operation in adaptive learning of the boost characteristic just after learning of a sector; and a boost characteristic resetting means for resetting the boost characteristic before the adaptive learning to an initial value before adaptive learning of the next sector when abnormality occurs in adaptive learning; and wherein the adaptive learning of the boost characteristic is carried out before the operation of reproducing the designated data.

Preferably, the abnormal learning detection means for detecting an abnormal operation in the adaptive learning of the equalizing characteristic just after learning of a sector compares an integrated value of squares of equalization errors of the waveform equalization means with an error threshold value to thereby detect an abnormal operation.

Preferably, the magnetic disk drive further has a maximum likelihood detecting means for most likely detecting a read waveform, wherein the abnormal learning detection means for detecting an abnormal operation in adaptive learning of the equalizing characteristic just after learning of a sector uses a difference metric value between path metric values of the maximum likelihood detecting means as data to be used for detecting the abnormal operation.

Preferably, the read waveform decoding means has an error detection means, wherein the abnormal learning detection means for detecting abnormality in adaptive learning of the equalizing characteristic just after learning of a sector judges an abnormal operation on the basis of a result of detection obtained by the error detection means.

According to a further aspect of the present invention, there is provided a signal processing chip used in a magnetic disk drive for controlling read/write data of a magnetic disk, having: a waveform equalizing means for equalizing a reproductive waveform; an adaptive learning means for adaptively learning the equalizing characteristic of the waveform equalizing means; a quality judgment means for judging the quality of an output signal of the waveform equalizing means; and a function of discarding a result of learning obtained by the adaptive learning means in accordance with a result of judgment obtained by the quality judgment means.

According to a further aspect of the present invention, there is provided a magnetic disk drive having a digital waveform processing means capable of continuously reproducing a plurality of sectors, wherein the magnetic disk drive further has: a sampled data holding means for holding a row of digital sampled data corresponding to at least one sector in a front stage of a waveform equalizing means contained in the digital waveform processing means; and an abnormal sector detection means for detecting abnormality in an output signal of the digital waveform processing means whenever a sector is read; and wherein, when the abnormal sector detection means detects abnormality in an output signal of the digital waveform processing means, the sampled data holding means holds a row of digital sampled data having the detected abnormality so that an abnormal sector is enabled to be decoded again by use of the data row held by the sampled data holding means.

Preferably, the adaptation speed of adaptive learning of the equalizing characteristic during an operation of read data is set to be lower than the adaptation speed of adaptive learning of the equalizing characteristic carried out before the data reproducing operation.

DESCRIPTION OF THE EMBODIMENTS

A first embodiment of the present invention will be described below with reference to FIGS. 1 through 10. The overall configuration of the HDD in this embodiment is substantially the same as that in the background art shown in FIG. 12, except a part of the PCB 30.

Figure 1:
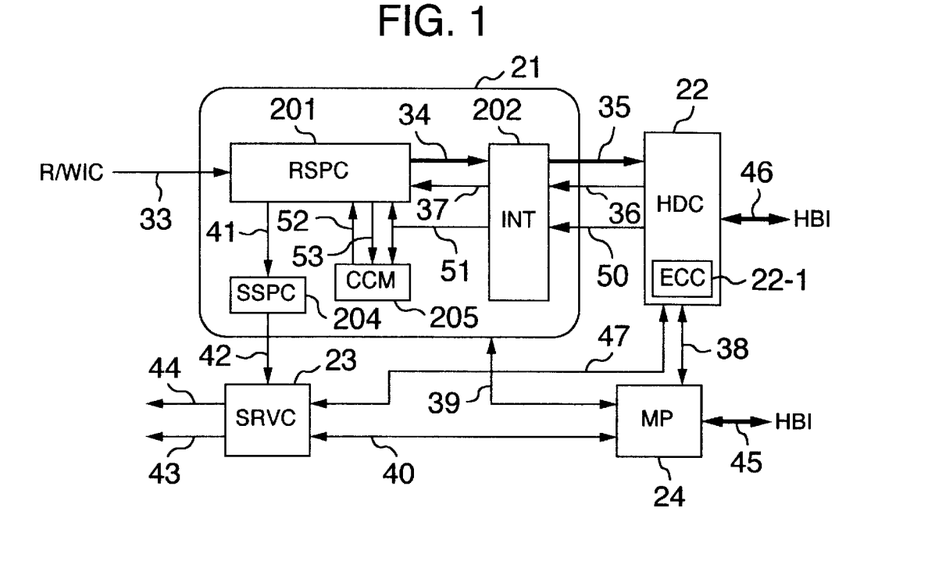
FIG. 1 is a diagram showing the overall configuration of a read signal processing system according to a first embodiment of the present invention.

FIG. 1 shows the overall configuration of a read signal processing system. A read signal 33 from an R/WIC 104 of an HDA 20 is supplied to a reproducing circuit (RSPC) 201 in a signal processing LSI (SPC) 21 in FIG. 1.

Figure 2:
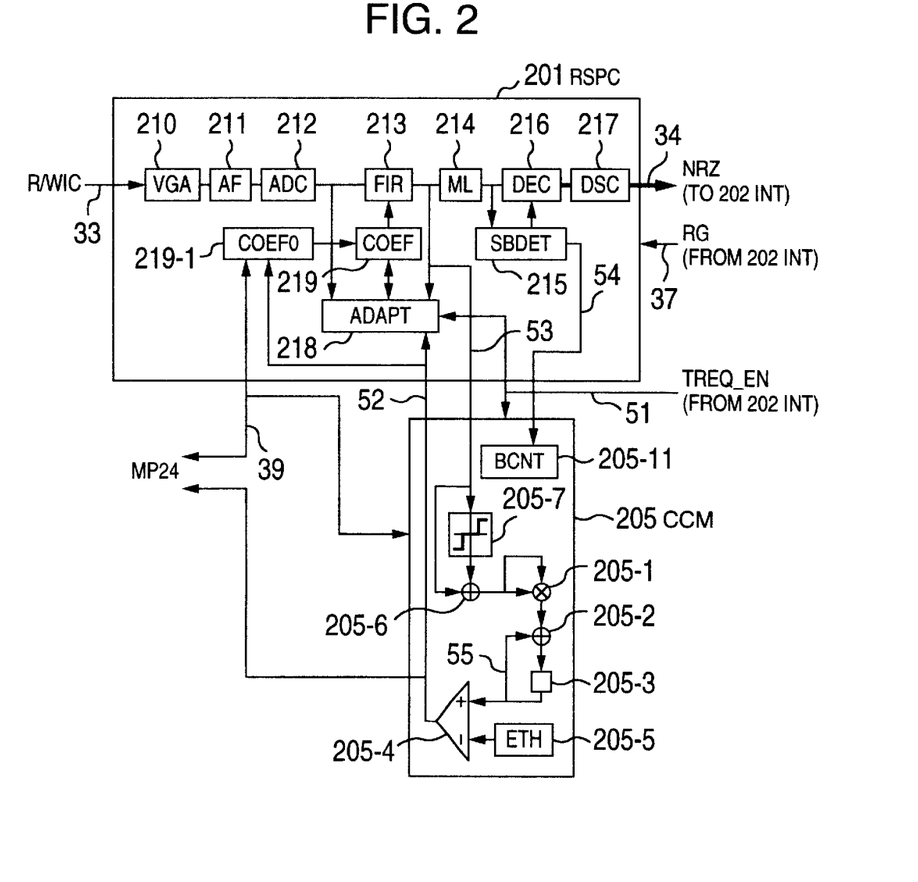
FIG. 2 is a diagram showing a reproducing circuit in the first embodiment of the present invention.

The signal is amplified to have a suitable amplitude by a variable-gain amplifier (VGA) 210 in the first stage of the RSPC 201 in FIG. 2. Unnecessary high-frequency noise is removed from the amplified signal, and the read waveform of the amplified signal is roughly equalized by an active filter (AF) 211.

Then, the signal of the AF 211 is converted into a digital signal by an A/D converter (ADC) 212, and finely equalized by a digital equalizer (FIR) 213 which is a waveform equalization means in the latter stage.

Further, the output of the FIR 213 signal is detected to a row of serial data by a maximum likelihood detector (ML) 214. A header which is a sync byte (SB) indicating the beginning of user data is detected in this data row by a sync byte detector (SBDET) 215.

The serial data row is converted into parallel data on the basis of a result of the detection. The parallel data is decoded by a decoder (DEC) 216 and further restored to data 34 through a descrambler (DSC) 217.

Here, the SBDET 215 generates a byte clock signal 54 to be outputted after detection of a sync byte and supplies the byte clock signal 54 to a channel condition measuring circuit (CCM) 205 which measures the channel condition statistically.

At this time, when a "training equalizer enable" signal (TREQ_EN) 51 is supplied to a coefficient learning circuit (ADAPT) 218 to instruct the circuit 218 to learn the coefficient of the FIR 213, the coefficient learning circuit (ADAPT) 218 as means of adaptively learning the coefficient indicating the equalizing characteristic of the FIR 213 is operated. As a result, an initial coefficient value registered in an initial equalizing characteristic setting register (COEFO) 219-1 by the MP 24 is registered as a coefficient value in the equalizing characteristic setting register (COEF) 219 of the FIR 213 to start successive learning. The initial coefficient value registered in the initial equalizing characteristic setting register (COEFO) 219-1 is used also for resetting the coefficient value registered in the equalizing characteristic setting register (COEF) 219.

Here, the TREQ_EN 51 is a control signal outputted from the HDC 22. In this case, the TREQ_EN 51 is outputted at the beginning of a sector previous to a target sector to be read out.

The TREQ_EN 51 is activated in a section including a data portion of a data sector, a CRC (cyclic redundancy check code) portion of data, and an ECC (error correction code).

In the case where a sector is separated by a servo region, the TREQ_EN is also separately output.

In this embodiment, a channel condition measurement (CCM) 205 for measuring the channel condition statistically to thereby detect an abnormal state in adaptive learning is further provided in the SPC 21. The CCM 205 is operated simultaneously with the operation of the ADAPT 218 on the basis of the coefficient learning gate signal (TREQ_EN) 51.

The CCM 205 includes a byte counter (BCNT) 205-11. In a period in which the TREQ_EN 51 is active, a byte clock signal 54 is outputted after SBD (sync byte detection). The number of pulses contained in the byte clock signal 54 is counted by the BCNT 205-11 before the length of the byte clock signal 54 reaches a predetermined total byte length consisting of a data length, a CRC length and a ECC length in a sector.

Even in the case where The TREQ_EN 51 is closed in the middle of counting because of a servo region, or the like, the BCNT 205-11 holds the count value so that the counting is restarted on the basis of the next "read gate" (RG) 37.

Accordingly, the internal sequencer of the CCM 205 can recognize the end of a sector even in the case where the sector is separated by a servo region, or the like.

In the CCM 205, statistical measurement is carried out in such a manner as follows. As shown in FIG. 2, errors in an output value row 53 of the FIR 213 are calculated by a combination of a comparator 205-7 and a substractor 205-6. The calculated errors are squared through a multiplier 205-1. The squared errors are further added up by a combination of an adder 205-2 and a data latch 205-3. This statistical measurement is carried out in a bit cycle.

At a point of time when the TREQ_EN 51 is closed and the statistical measurement of a sector is completed, a comparator 205-4 compares a result 55 of the statistical measurement with an error threshold value (ETH) 205-5 which is set by the MP 24.

A numerical value beyond an allowable range based on ordinary environmental changes, or the like, is set in the ETH 205-5 so that a state in which a result of coefficient learning is abnormal can be judged clearly on the basis of the numerical value.

If the result 55 of the measurement is larger than the ETH 205-5, it is concluded that the operation in adaptive learning is abnormal, and a control signal 52 is issued to the ADAPT 218 to discard the coefficient value registered in the COEF 219.

In this manner, the initial coefficient value registered in the COEFO 219-1 is set in the COEF 219 again.

That is, an adaptive learning operation is checked for every sector (DS1, . . . DSN) so as to make it possible to discard a result of learning in real time if the operation is abnormal.

The "read gate" signal (RG) 37 is supplied from the data region DS1. Most portions of the RSPC 201 except the ADAPT 218 are operated on the basis of the RG 37 to read data.

Incidentally, the control signal 52 serves also as an abnormal sector detection signal and the CCM serves also as an abnormal sector detection means and also as a quality judgment means for judging the quality of an output signal of the waveform equalizing means.

The control operation of this embodiment will be described below in detail.

Figure 9:
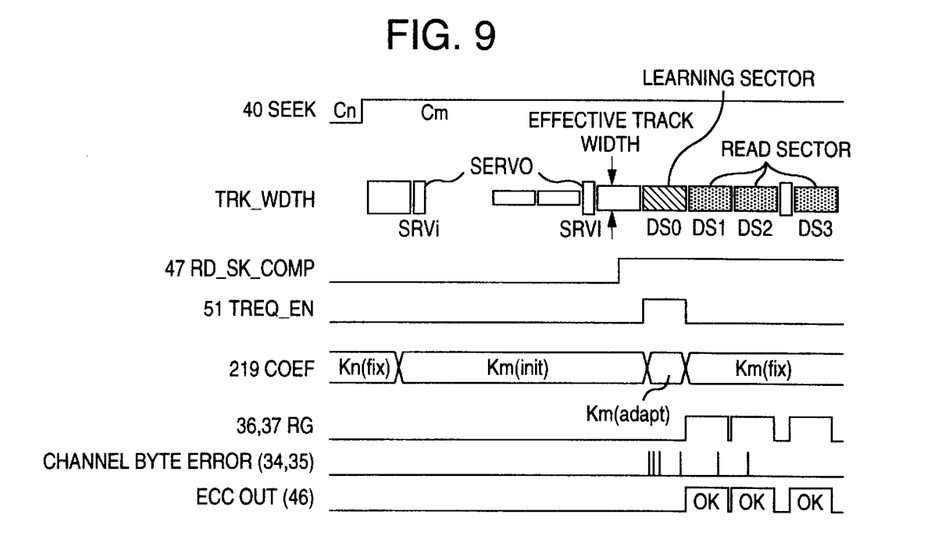
FIG. 9 is a time chart showing a sequence of operations in the first embodiment of the present invention in the case where positional divergence after seeking is relatively small.
Figure 10:
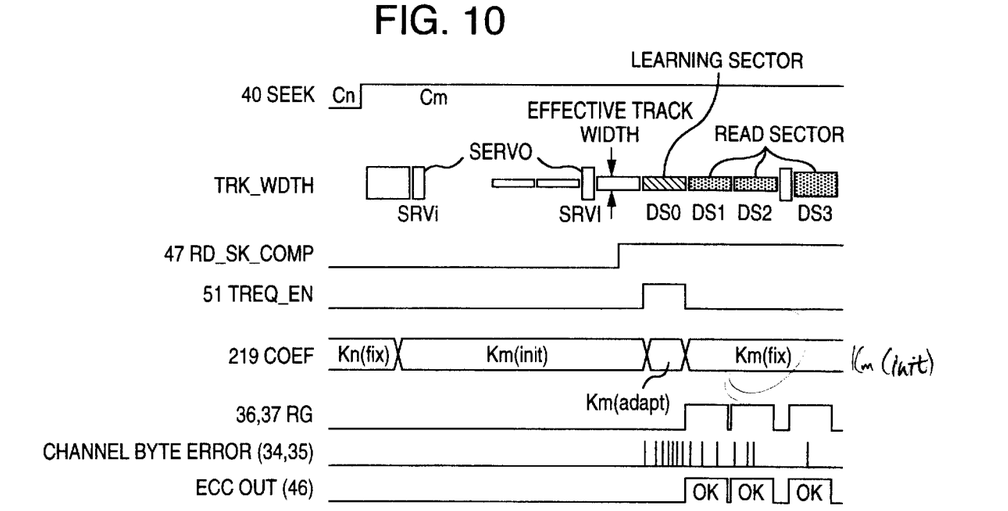
FIG. 10 is a time chart showing a sequence of operations in the first embodiment of the present invention in the case where positional divergence after seeking is relatively large.

Here, the control operation will be described in the case where a plurality of data sectors DS1, DS2, DS3 . . . are read successively just after a cylinder is sought from Cn to Cm as shown in FIGS. 9 and 10.

FIG. 9 shows the case where positional divergence after seeking is so small that the effective track width is wide. FIG. 10 shows the case where positional divergence after seeking is so large that the effective track width is narrow.

The description of the control operation will be omitted here in such a case where a data sector is separated by a servo region.

The control operation will be described first in the case where positional divergence of the read head after seeking is relatively small as shown in FIG. 9.

When a "seek" command (SEEK) 40 is given to the SRVC 23 from the MP 24, an initial coefficient Km(init) corresponding to the cylinder Cm is set, through the COEFO 219-1, in the COEF 219 which registers the coefficient value of the FIR 213.

When a "read seek complete" signal (RD_SK_COMP) 47 is given to the HDC 22, the HDC 22 outputs a coefficient learning gate signal (TREQ_EN) 51 prior to the data region DS1 (that is, the coefficient is learned prior to the data region DS1).

In this embodiment, the region in which the TREQ_EN 51 is active is a data region DS0 which is one sector previous to the data region DS1 as shown in FIG. 9.

The learning region DS0 is also a sector in which user data is recorded. The sector DS0 is, however, other than target sectors to be read out (that is, other than sectors designated by a user to be read out).

In this case, the effective track width is relatively wide. Accordingly, even in the case where the initial coefficient value Km(init) is divergent because of environmental changes, or the like, the ADAPT 218 operates normally. Accordingly, the coefficient value Km is adapted consecutively in the learning region DS0, so that errors (divergence from the target value) in an output of the FIR 213 are reduced slowly.

When, for example, channel byte errors are contained in NRZ outputs 34 and 35 in the leading portion of the DS0 as shown in FIG. 9, the errors are reduced with the advance of learning.

Even in the case where head/disk characteristic, head spacing, and so on, vary in accordance with the change of the operating environment, such as temperature, atmospheric pressure, etc., of the HDD 10 to thereby change the resolving power of the read signal 33, the coefficient value registered in the COEF 219 is changed consecutively to a coefficient value for giving good read performance.

Here, the result 55 of the statistical measurement in the channel condition measurement (CCM) 205 becomes smaller than the ETH 205-5. Accordingly, the control signal 52 is not output.

In this embodiment, the coefficient value adaptively learned is fixed in the COEF 219 in the target sectors to be read out. Data on and after the DS1 are read (reproduced) continuously by the fixed coefficient value.

Further, adaptive learning is carried out only in a region preceding a data reproducing region. Accordingly, the step parameter of the ADAPT 218 can be set to be large, so that high-speed adaptation can be made.

Further, the adaptive operation is stopped in the data reproducing region. Accordingly, the deterioration of read performance caused by adaptive noise in a region to be read can be avoided.

On the other hand, in the case where positional divergence after seeking is so large that the effective track width is narrow as shown in FIG. 10, the equalizing characteristic of the FIR varies widely in accordance with the abnormal operation of the ADAPT 218. Accordingly, errors in the output of the FIR and channel errors increase.

On this occasion, the result 55 of the statistical measurement in the channel condition measuring circuit (CCM) 205 increases rapidly with the advance of learning so that the result 55 becomes larger than the ETH 205-5.

Accordingly, the control signal 52 is outputted. The coefficient value after adaptive learning is reset to the initial coefficient value Km(init). The following data regions DS1 . . . are read on the basis of the initial coefficient value (fixed) set at the time of shipping.

In this case, improvement of performance due to adaptive learning cannot be expected. There is, however, a high possibility of avoiding the situation that adaptive learning malfunctions so that reading is made on the basis of widely diverged equalizing characteristic to thereby make errors continuously in the following sectors to make real-time ECC correction impossible. Accordingly, a retry operation accompanied with rotational latency can be prevented from occurring frequently.

Incidentally, it is obvious that the same effect as described above can be obtained also when a result of error detection in the ECC in the HDC is used as the control signal 52 for discarding the coefficient value registered in the COEF 219. Further, the control signal using a result of error detection in the ECC serves also as an abnormal sector detection signal and the ECC in the HDC serves also as an abnormal sector detection means and also as a quality judgment means for judging the quality of an output signal of the waveform equalizing means.

It is further obvious that the adaptive coefficient learning region in which the TREQ_EN 51 is active may be constituted by a plurality of sectors (DS0 to DS3).

In this case, learned coefficients are discarded continuously in a part of the learning region in which a sufficient effective track width cannot be obtained. From a point of time when a sufficient effective track width is obtained, a normal coefficient value is obtained.

A wide learning region can be secured on average compared with the case where coefficient learning is carried out in only one sector just before the RG 37 is activated. Accordingly, the probability that adaptive learning is completed normally becomes so high that the frequency in use of the retry can be reduced more greatly.

If a wide learning region can be secured, the step parameter (corresponding to the adaptation speed of adaptive learning) for adaptive learning can be reduced. Accordingly, the stability of learning increases.

Incidentally, if there is no learning sector taken in prior to the DS1 after outputting of the RD_SK_COMP 47, a learning sector accompanied with rotational latency may be secured or sectors DS1 and after DS1 may be read without rotational latency.

Further, the learning sector may be preferably secured just before the DS1 after outputting of the RD_SK COMP 47. This is because there is a high possibility that positional divergence becomes small with the passage of time after outputting of the RD_SK_COMP 47.

Although the above description has been made upon the case where adaptive learning is carried out in a region preceding a data reproducing region, the prevent invention can be applied also to the case where adaptive learning is carried out in a data reproducing region. In this case, if a result of learning is abnormal, the coefficient value after leaning may be reset to the initial coefficient value Km(init) so that data reading is made in the following data region.

Although the aforementioned embodiment has shown the case where adaptive learning is not carried out during the reading operation, it is a matter of course that adaptive learning may be carried out during the reading operation while the influence of adaptive noise is suppressed if the step parameter is set suitably (the step parameter is changed over between a value for the exclusive learning region before reading and a value for the reading operation).

In this case, when the result of the statistical measurement in the CCM in data reading deteriorates, the coefficient value in sector reading just after the data reading is reset to the initial coefficient value Km(init) so that sectors in which errors occur frequently are prevented from being generated continuously.

Figure 3:
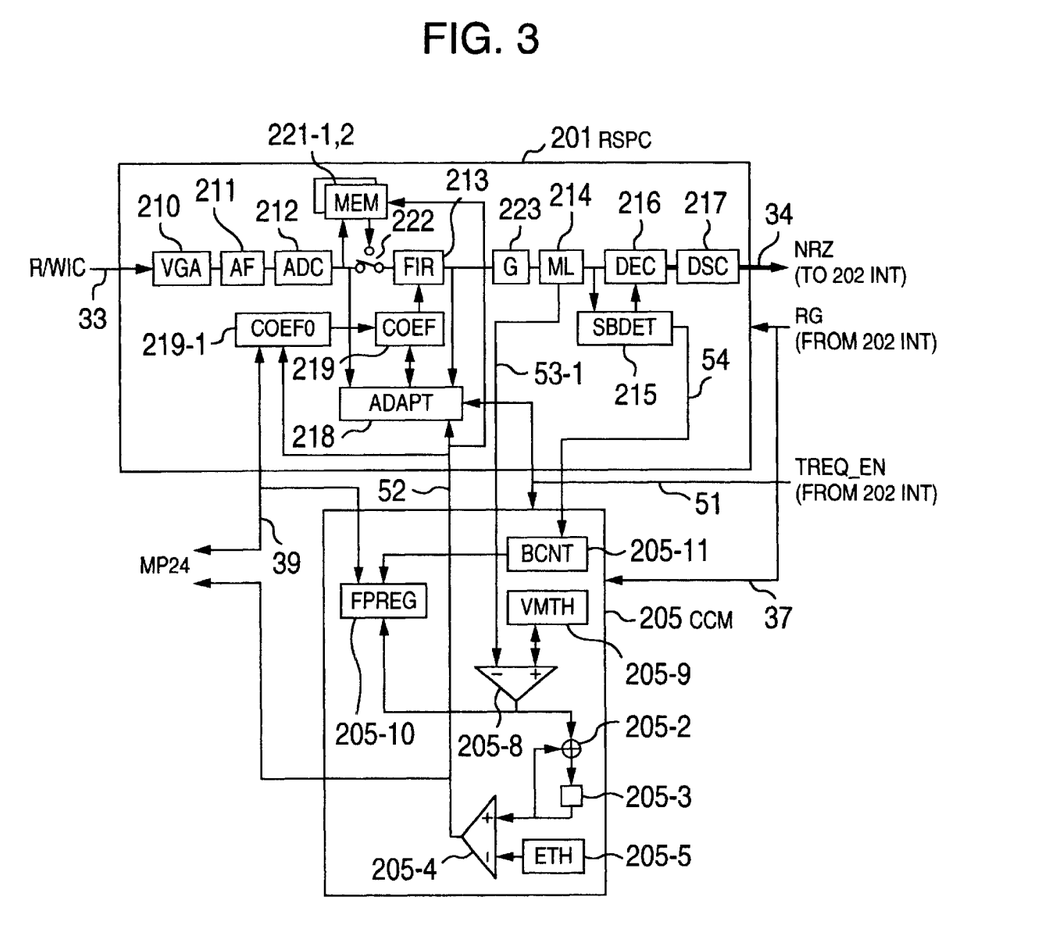
FIG. 3 is a diagram showing a reproducing circuit according to a second embodiment of the present invention.

A second embodiment of the present invention will be described below with reference to FIG. 3.

In this embodiment, a reproducing circuit (RSPC) 201 and a channel condition measuring circuit (CCM) 205 which are different constituent parts from those in the first embodiment will be described as the center of the subject.

In this embodiment, a waveform memory (MEM) 221 for storing a row of output values of the ADC in time sequence is constituted by an MEM1 221-1 and an MEM2 221-2 for two sectors on the assumption that a sector is split (a sector is separated by a servo region).

Further, the smallest value 53-1 of difference metric values between path metric values in respective conditions in a maximum likelihood detector (ML) 214 is used for the statistical measurement in the channel condition measuring circuit (CCM) 205.

The smallest value 53-1 of difference metric values is supplied to a comparator 205-8 in the CCM 205 so as to be compared with a difference metric threshold value (VMTH) 205-9 which is set by the MP 24 in advance.

If the smallest value 53-1 of difference metric values is smaller than the VMTH 205-9, the possibility of occurrence of errors is regarded as being high so that a data latch 205-3 is counted up by an adder 205-2.

At the same time, byte clock pulses 54 outputted from the SBDET 215 are regarded as flag points and the byte clock pulses 54 are registered in a flag point register (FPREG) 205-10 successively.

After bytes corresponding to one sector are counted by the BCNT 205-11 after the TREQ_EN 51 (or RG 37) is activated, the count value of the data latch 205-3 is compared with an error threshold value (ETH) 205-5 set in advance. If the count value of the data latch 205-3 is larger than the ETH 205-5, the sector is regarded as an abnormal sector and the control signal 52 is outputted.

On the basis of the control signal 52, the coefficient value learned at the time of coefficient learning is discarded and the initial coefficient value registered in the COEFO 219-1 is set in the register COEF 219. The coefficient value after learning is set in the same manner as in the first embodiment.

The control signal 52 serves also as an abnormal sector detection signal. The CCM in FIG. 3 serves as an abnormal sector detection means and also as a quality judgment means for judging the quality of an output signal of the waveform equalizing means.

Incidentally, the FPREG 205-10 may be provided in the HDC 22 so that an output of the comparator 205-8 is outputted as an error-possibility flag signal to the HDC 22.

On the other hand, the waveform memories (MEM1 and MEM2) 221-1 and 221-2 are subjected to data recording at the time of data reading. A sampled waveform after the operation of the ADC 212 is fetched in the MEM1. A second-half portion of a sector split by a servo region is fetched in the MEM2.

On this occasion, when a lot of error flags are generated from the comparator 205-8 so that the count value of the data latch 205-3 exceeds the threshold value of the ETH 205-5, the control signal 52 is supplied to the MEM 221 so that overwriting in the MEM 221 on the basis of the RG 37 after that is stopped.

The control signal 52 is also supplied to the MP 24 so that the MP 24 is informed of recording of failure sector candidate data in the MEM 221.

On the basis of the information given to the MP 24, the MP 24 can know whether the sector concerning outputting of the control signal 52 has been corrected by CRC check of the ECC 22-1 in the HDC 22 or not. If the sector has been not corrected, the waveform data recorded in the MEM 221 is selected through a switch (SW) 222 so that the waveform in the MEM 221 is supplied to the FIR 213 on the basis of a suitable RG 37 input from the HDC 22. As a result, decoding (retry-on-the fly) can be made without data access on the disk. When the sector is split, both MEM1 and MEM2 are used.

On this occasion, the coefficient value of the FIR 213 and the gain (G) 223 can be changed on the basis of the FPREG 205-10 or erasure correction (correction for restoring erased data) using the FPREG 205-10 as an erasure position (erasing position of data), or the like, can be made.

Further, in the background art, when even one sector in continuous sectors cannot be corrected by real-time ECC, there is generally a high possibility that errors occur to make it impossible to correct the following sectors. Accordingly, a continuous reading operation must be stopped so that a retry operation is carried out from the error sector. That is, in the background art, there is a high possibility that rotational latency corresponding to one rotation is required.

When the present invention is used, rotational latency can be eliminated in most cases.

An operational sequence from the start of "read seek" in a second embodiment of the present invention will be described below with reference to FIGS. 4 through 8 which are flow charts.

Figure 4:
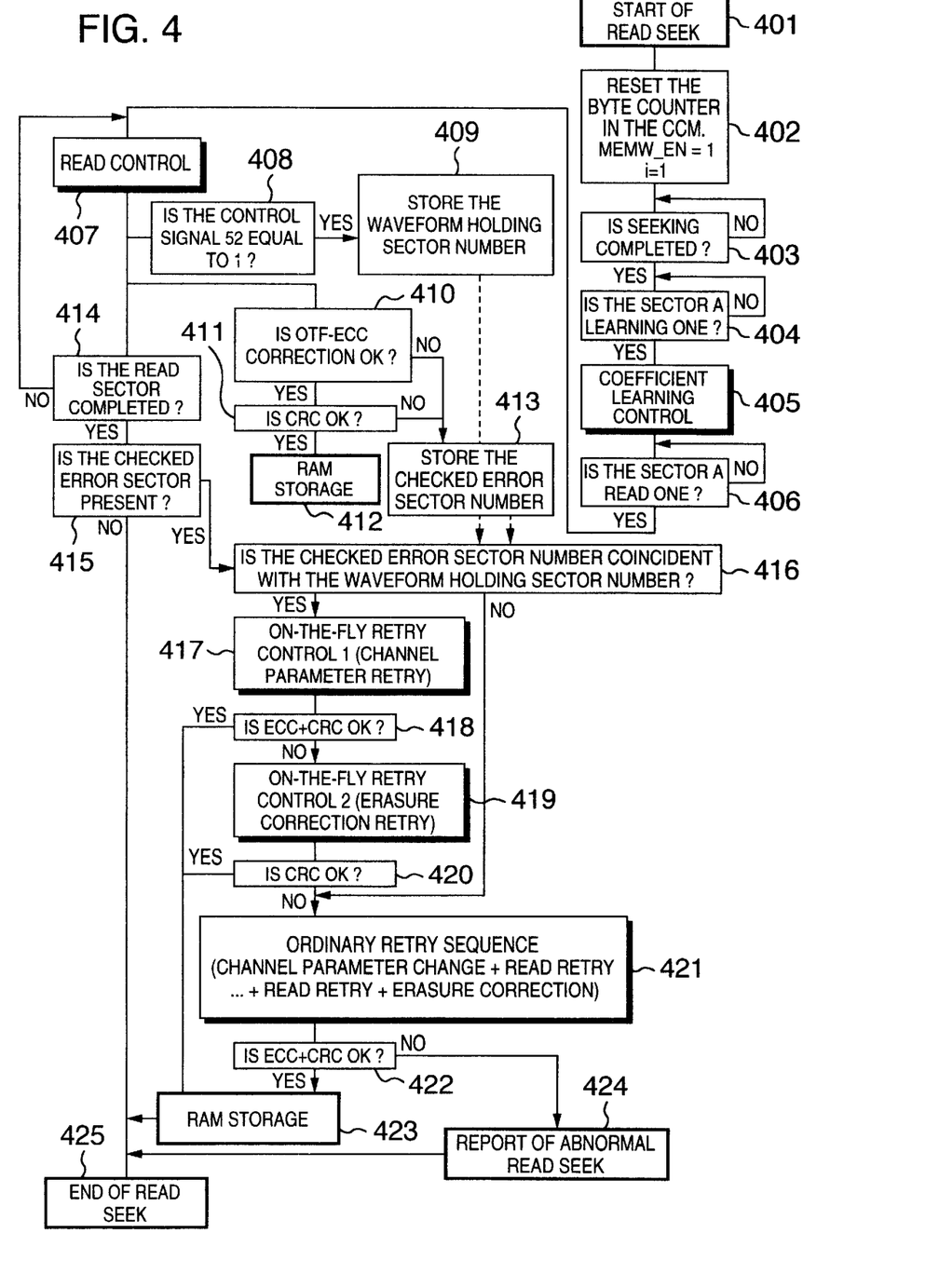
FIG. 4 is a flow chart showing a read seek control sequence in the controller in the second embodiment of the present invention.
Figure 5:
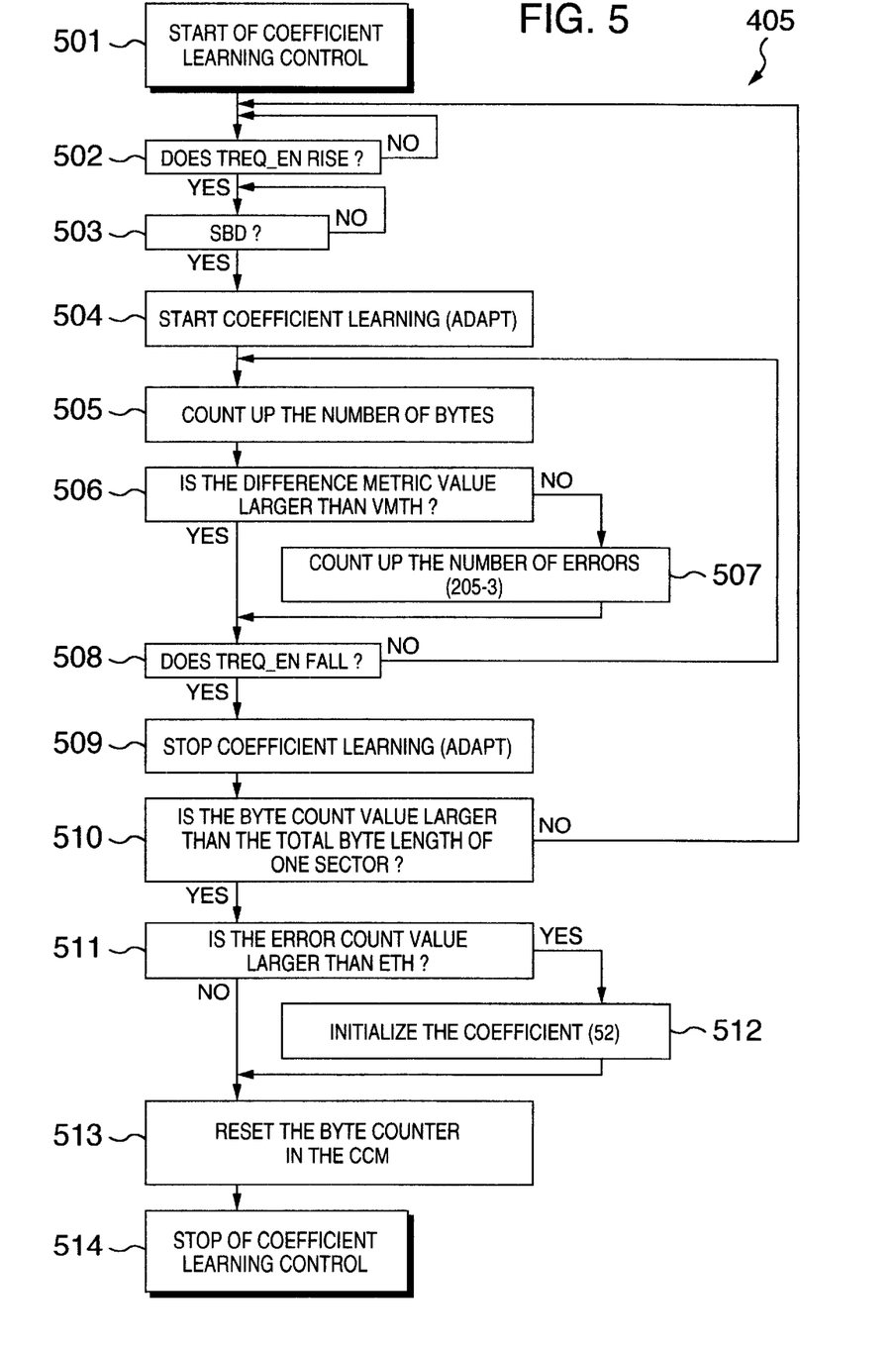
FIG. 5 is a flow chart showing a coefficient learning control sequence in the second embodiment of the present invention.
Figure 6:
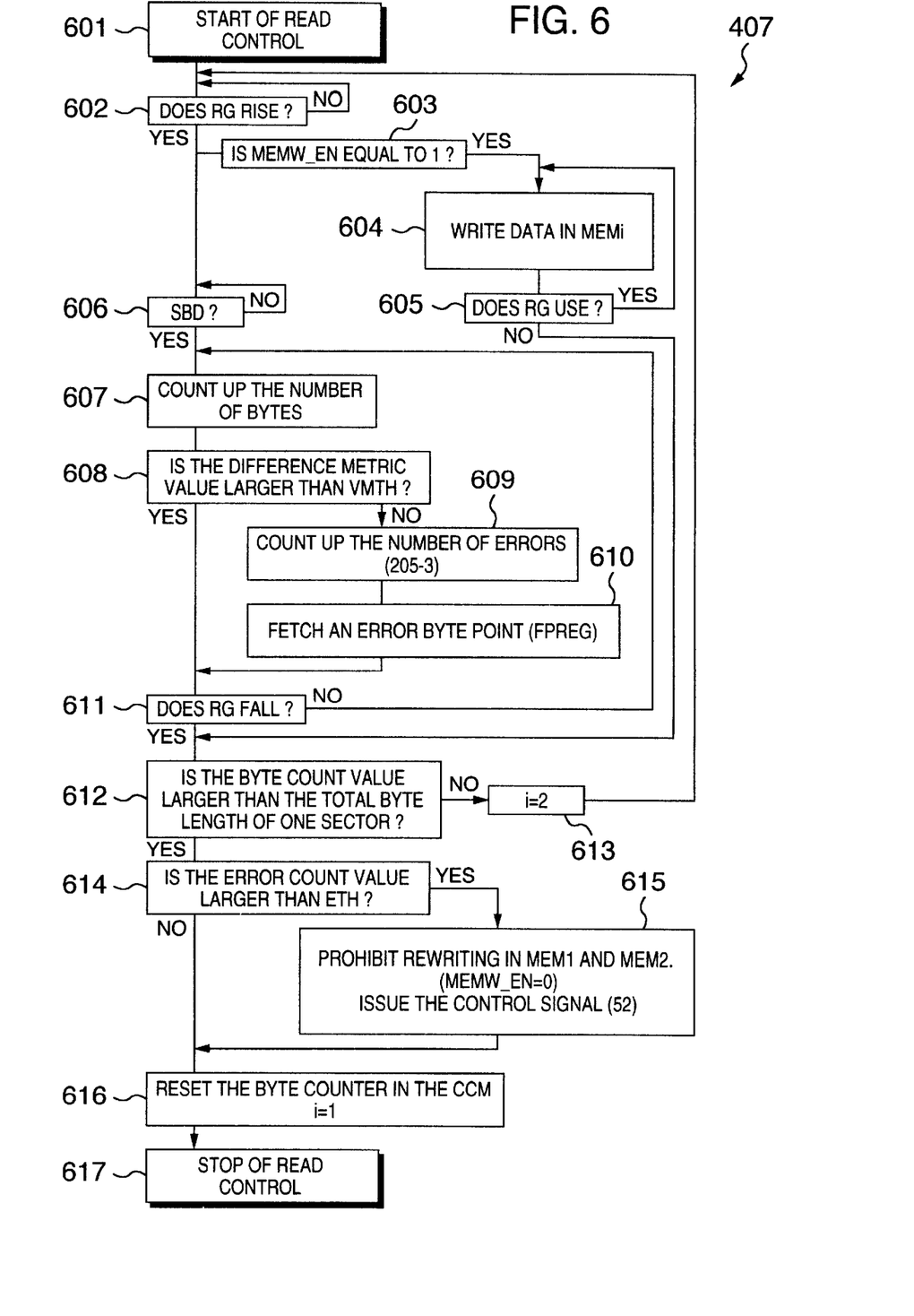
FIG. 6 is a flow chart showing a read control sequence in the second embodiment of the present invention.

FIG. 4 shows a high-order sequence viewed from the controller side. FIG. 5 shows a detailed sequence for coefficient learning control. FIG. 6 shows a detailed sequence for data reading control.

Figure 7:
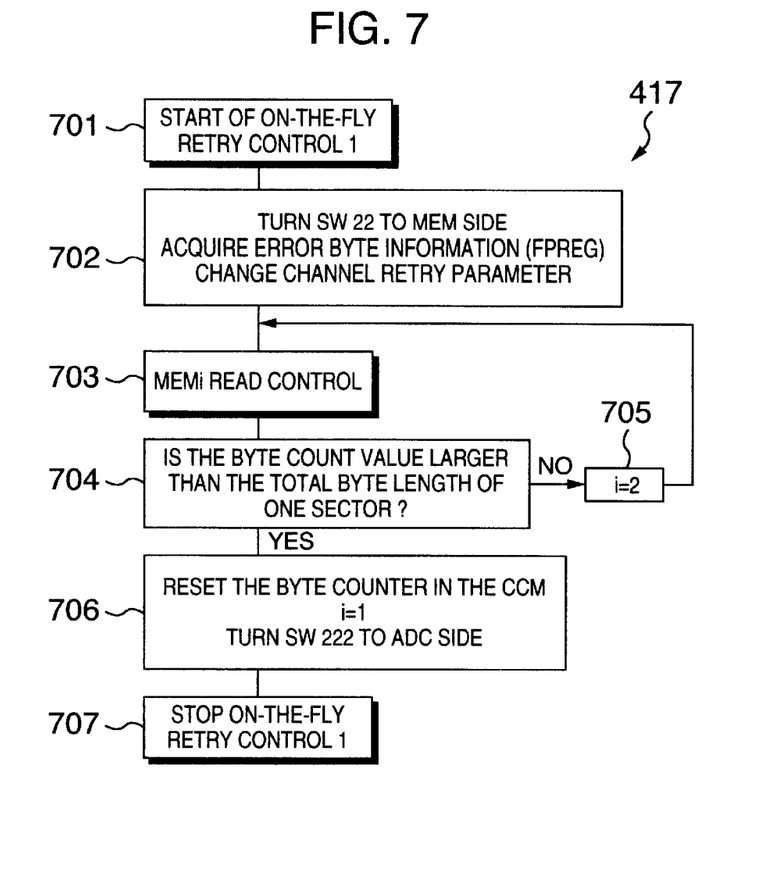
FIG. 7 is a flow chart showing a retry sequence using a waveform memory in the reproducing circuit in the second embodiment of the present invention.
Figure 8:
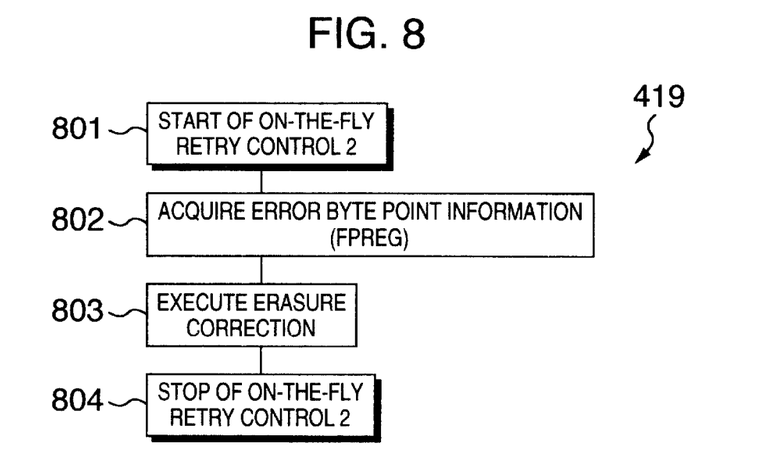
FIG. 8 is a flow chart showing an erasure correction method using error position information in the reproducing circuit in the second embodiment of the present invention.

FIG. 7 shows a sequence for on-the-fly retry control 1 using both MEM1 and MEM2. FIG. 8 shows an erasure correction method using a flag point register (FPREG).

As shown in FIG. 4, when "read seek" is started (step 401), the byte counter (BCNT) in the CCM is reset and MEMW_EN=1 and i=1 are set as one setting of registers for reading to thereby make it possible to record data in the MEM1.

When "seek" is completed (step 403) and a sector position for coefficient learning is reached (step 404), "coefficient learning control" is started (step 405).

As shown in FIG. 5, when TREQ_EN 51 rises (steps 501 and 502) and a sync byte is detected (SBD) (step 503), the coefficient learning circuit (ADAPT) is started (step 504).

At the same time, while the number of bytes is counted (BCNT) (step 505), the difference metric value in the decoder is compared with the threshold value (VMTH) (step 506). As the difference metric value decreases, the result of judgment becomes more obscure. If the difference metric value is smaller than the VMTH, the number of errors (205-3) is counted up (step 507). This procedure (steps 505 to 507) is repeated unless the TREQ_EN falls (step 508).

At this point of time, "coefficient learning" is stopped (step 509) and checking is made as to whether the byte count value exceeds the total byte length (for example, data length+CRC length+ECC length) of one sector or not (step 510).

If the byte count value does not exceed the total byte length of one sector because of splitting, or the like, waiting for second-half TREQ_EN to rise is performed. If one sector is completed, the error count value is checked (step 511). If the error count value exceeds the threshold value (ETH), the coefficient obtained by coefficient learning is discarded and reset to the initial coefficient value which is a value before learning (step 512).

Further, the byte counter (BCNT) in the CCM is reset (step 513) and "coefficient learning control" is terminated (step 514).

As shown in FIG. 4, after waiting for the arrival of the read sector (step 406), "read control" shown in FIG. 6 is started (step 407).

Various registers necessary for reading are set in advance when "read seek" is started (step 401).

When the RG rises (step 602), sampled values of the ADC are recorded in the MEM1 before the RG falls (steps 603, 604, 605 and 611).

On the other hand, in a data reproducing system, a sync byte is detected (SBD) (step 606), the number of bytes is counted (BCNT) (step 607) and the difference metric value on the maximum likelihood detector is compared with the threshold value (VMTH) (step 608). If the difference metric value is smaller than the VMTH, the number of errors (205-3) is counted up (step 609) and error byte positions are registered in the flag point register (FPREG) (step 610). This procedure (steps 607 to 610) is repeated unless the RG falls (step 611).

At the point of time when the RG falls, "coefficient learning" is stopped and the byte count value (BCNT) is checked (step 612). If the byte count value does not exceed the total byte length of one sector because of splitting, or the like, i=2 is set and waiting for second-half RG to rise is performed (step 613).

If one sector is completed, the error count value is checked (step 614). If the error count value exceeds the threshold value (ETH), writing in both MEM1 and MEM2 is prohibited (MEMW_EN=0) and the control signal 52 indicating the frequent occurrence of errors is sent to the controller side to thereby inform the controller side that a row of sampled data in the read sector have been recorded in the MEM (step 615).

Further, the byte counter (BCNT) in the CCM is reset and i=1 is set (step 616). Thus, "read control" of one sector is completed (step 617).

As shown in FIG. 4, if the control signal 52 has a value of "1" in the controller side (step 408), the waveform holding sector No. is stored (step 409).

Further, on-the-fly ECC (OTF-ECC) correction (ECC correction of data which have been already read) is executed (step 410) and CRC check is executed (step 411). If either OTF-ECC correction or CRC check has resulted in failure, the checked error sector No. is stored (step 413). If both OTF-ECC correction and CRC check have resulted in success, read data are stored in the buffer RAM (step 412).

Unless the sector to be read is completed in parallel with the "ECC and CRC check" operation, "read control" is operated continuously (steps 414 and 407).

If there is no sector to be read, checking is made as to whether there is any sector which has resulted in failure by OTF-ECC or CRC check (step 415). If the checked error sector No. is stored, the checked error sector No. is compared with the waveform holding sector No. (step 416). If the checked error sector No. does not coincide with the waveform holding sector No., an ordinary retry sequence is carried out (step 421).

If the checked error sector No. coincides with the waveform holding sector No., "on-the-fly retry control 1" is carried out (step 417) as follows.

FIG. 7 shows the outline of an operational sequence (step 701) for "on-the-fly retry control 1".

The SW 222 in the read signal processing circuit (RSPC) is turned to the MEM side so that error byte point information (FPREG) is acquired. The setting of parameter in the RSPC is changed on the basis of the distribution of error byte points (step 702).

In the case where errors occur because of medium failure and thermal asperity caused by an MR head, the errors are concentrated in specific byte points. In the case where errors occur because of an S/N factor such as the change of resolving power, positioning failure, or the like, error points are dispersed.

Various combinations are thought of. For example, in the former, the gain G is controlled and, in the latter, the coefficient value of the FIR is adjusted.

In this condition, a row of data recorded in the MEM1 can be decoded again when the RG from the controller side is input into a suitable position (step 703). The timing of outputting the RG from the controller side may be determined suitably if the timing is out of servo region.

Incidentally, also in a continuous reading state, when reading of sectors corresponding to at least one track is completed and the track or head is shifted to a next one, an idle time corresponding to several sectors is always required for positioning the track to a new one or changing the head to a new one. Accordingly, this time can be applied to "on-the-fly retry control 1".

At the point of time when data stored in the MEM1 are decoded again, the number of bytes in the BCNT is checked. If the number of bytes does not reach the total byte length (because of sector splitting) (step 704), data stored in the MEM2 are further decoded again (step 705).

After data are decoded again, both resetting of the byte counter (BCNT) in the CCM and setting of i=1 are performed and the SW 222 is turned to the ADC side (step 706). Thus, "on-the-fly retry control 1" of the sector in which errors occur frequently is terminated (step 707).

As shown in FIG. 4, a result of decoding data again is checked in the controller side on the basis of ECC+CRC (step 418). If the checking has resulted in success, data are stored in the buffer RAM (step 423) and "read seek" for continuous sectors is completed (step 425).

If the checking on the basis of ECC+CRC has resulted in failure, "on-the-fly retry control 2" is used (step 419). As shown in FIG. 8, erasure correction on the basis of acquisition of error byte point information (FPREG) is carried out (steps 801, 802, 803 and Incidentally, when erasure correction cannot be carried out in real time as the time required for erasure correction, "on-the-fly retry control" is not carried out but an ordinary retry sequence shown in FIG. 4 is carried out (steps 420, 421, 422 and 424). In the ordinary retry sequence, erasure correction is carried out. On this occasion, error byte point information (FPREG) can be utilized.

Although this embodiment has shown an example of configuration applied to the abnormality of one sector in continuous reading of a plurality of sectors, it is obvious that the present invention can be applied to the abnormality of some sectors in continuous reading of a plurality of sectors if the MEM capacity is set to be larger.

Figure 11:
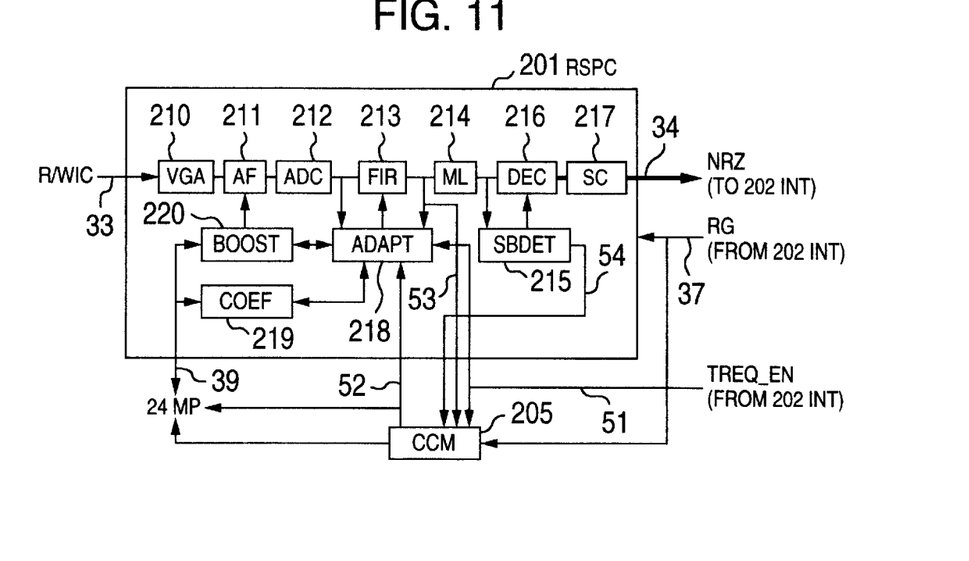
FIG. 11 is a diagram showing a reproducing circuit constituting a third embodiment of the present invention.

A third embodiment of the present invention will be described below with reference to FIG. 11.

In this embodiment, description will be made on only the reproducing circuit (RSPC) 201 which is a constituent part different from that in the first embodiment.

In this embodiment, the ADAPT 219 is configured so as to adaptively control a register (BOOST) 220 used for setting the boost quantity of an active filter (AF) 211.

Upon reception of a "seek" command 40, the MP 24 sets the coefficient value registered in the COEF0 219 for determining the equalizing characteristic of the FIR 213 and also sets the initial boost quantity (BOOST0) 220 of the AF 212.

In this condition, when the TREQ_EN 51 is issued from the HDD 22, the ADAPT 218 adaptively controls the BOOST 220 on the basis of the input and output of the FIR 213 so that error in the output of the FIR 213 is minimized.

The CCM 205 detects the error at this time to thereby monitor whether the BOOST 220 is controlled suitably or not. If the BOOST 220 is not controlled suitably, the BOOST 220 is reset to the initial boost quantity (BOOST0) on the basis of the control signal 52. The criterion of judgment is the same as in the first embodiment.

In this embodiment, the change of resolving power caused by the environmental change of the head/disk is compensated on the basis of the setting of the BOOST 220 of the AF which is an analog circuit.

Transient response accompanying the change of the boost setting quantity of the AF is so continuous that a relatively smooth adaptive equalizing operation can be made. Accordingly, deterioration caused by adaptive noise can be avoided when the coefficient of the FIR is changed.

Accordingly, in this embodiment, an adaptation operation can be continued easily also in data reproduction.

In this case, the CCM monitoring the control condition of the adaptation operation may be operated simultaneously in data reproduction so that the boost quantity is reset to the initial boost quantity when the increase of errors or the frequent occurrence of data errors is detected.

It is a matter of course that this embodiment can be combined with the MEM 221 as shown in the second embodiment.

According to the aforementioned embodiments of the present invention, the adaptability of read signal processing of a magnetic disk drive to environmental changes, or the like, can be enhanced so that the frequency in use of retry or miscorrection can be reduced. Accordingly, a high-performance low-cost magnetic disk drive can be provided.

What is claimed is:

1. A magnetic disk drive comprising a waveform equalizer which equalizes waveforms reproduced from a magnetic disk, and an adaptive learning unit which adaptively learns an equalizing characteristic of said waveform equalizer, wherein said magnetic disk drive further comprises an abnormal learning which detects an abnormal operation in said adaptive learning unit just after learning of a sector when said adaptive learning unit adaptively learns the equalizing characteristic of said waveform equalizer, and an equalizing characteristic resetter which resets the equalizing characteristic before adaptive learning to an initial value before learning of a next sector when said abnormal learning detector detects abnormality in said adaptive learning unit; wherein said abnormal learning detector which detects an abnormal operation in said adaptive learning of said equalizing characteristic just after learning of a sector compares an integrated value of squares of equalization errors of said waveform equalizer with an error threshold value to thereby detect an abnormal operation.

2. A magnetic disk drive according to claim 1, wherein said adaptive learning of said equalizing characteristic is performed simultaneously with an operation of reproducing designated data.

3. A magnetic disk drive according to claim 1, wherein said adaptive learning of said equalizing characteristic is performed before an operation of reproducing designated data.

4. A magnetic disk drive according to claim 3, wherein the equalizing characteristic of said waveform equalizing means is fixed during the operation of reproducing the designated data.

5. A magnetic disk drive comprising a waveform equalizer which equalizes waveforms reproduced from a magnetic disk, and an adaptive learning unit which adaptively learns an equalizing characteristic of said waveform equalizer, wherein said magnetic disk drive further comprises an abnormal learning which detects an abnormal operation in said adaptive learning unit just after learning of a sector when said adaptive learning unit adaptively learns the equalizing characteristic of said waveform equalizer, and an equalizing characteristic resetter which resets the equalizing characteristic before adaptive learning to an initial value before learning of a next sector when said abnormal learning detector detects abnormality in said adaptive learning unit; further comprising a maximum likelihood detector which most likely detects a read waveform, wherein said abnormal learning detector which detects an abnormal operation in said adaptive learning of said equalizing characteristic just after learning of a sector uses a difference metric value between path metric values of said maximum likelihood detector as data to be used for detecting said abnormal operation.

6. A magnetic disk drive according to claim 5, wherein said adaptive learning of said equalizing characteristic is performed simultaneously with an operation of reproducing designated data.

7. A magnetic disk drive according to claim 5, wherein said adaptive learning of said equalizing characteristic is performed before an operation of reproducing designated data.

8. A magnetic disk drive according to claim 7, wherein the equalizing characteristic of said waveform equalizing means is fixed during the operation of reproducing the designated data.

9. A signal processing chip used in a magnetic disk drive for controlling read/write data of a magnetic disk, comprising: a waveform equalizer which equalizes a read waveform; an adaptive learning unit which adaptively learns an equalizing characteristic of said waveform equalizer; a quality judger which judges quality of an output signal of said waveform equalizer; and a function of discarding a result of learning obtained by said adaptive learning unit in accordance with a result of judgment obtained by said quality judger; wherein said quality judger which judges an abnormal operation in said adaptive learning of said equalizing characteristic just after learning of a sector compares an integrated value of squares of equalization errors of said waveform equalizer with an error threshold value to thereby detect an abnormal operation.

10. A signal processing chip used in a magnetic disk drive for controlling read/write data of a magnetic disk, comprising: a waveform equalizer which equalizes a read waveform; an adaptive learning unit which adaptively learns an equalizing characteristic of said waveform equalizer; a quality judger which judges quality of an output signal of said waveform equalizer; and a function of discarding a result of learning obtained by said adaptive learning unit in accordance with a result of judgment obtained by said quality judger; further comprising a maximum likelihood detector which most likely detects a read waveform, wherein said quality judger which judges an abnormal operation in said adaptive learning of said equalizing characteristic just after learning of a sector uses a difference metric value between path metric values of said maximum likelihood detector as data to be used for detecting said abnormal operation.

* * * * *